(12) United States Patent
Kubota et al.

(10) Patent No.: US 8,900,091 B2
(45) Date of Patent: Dec. 2, 2014

(54) PLANETARY GEAR REDUCTION MECHANISM

(75) Inventors: Yukio Kubota, Hadano (JP); Michihiro Kameda, Hadano (JP)

(73) Assignee: Nittan Valve Co., Ltd., Hadano-shi (JP)

( * ) Notice: Subject to any disclaimer, the term of this patent is extended or adjusted under 35 U.S.C. 154(b) by 0 days.

(21) Appl. No.: 13/985,175

(22) PCT Filed: Feb. 24, 2012

(86) PCT No.: PCT/JP2012/054527
§ 371 (c)(1),
(2), (4) Date: Aug. 13, 2013

(87) PCT Pub. No.: WO2013/125023
PCT Pub. Date: Aug. 29, 2013

(65) Prior Publication Data
US 2014/0031165 A1    Jan. 30, 2014

(51) Int. Cl.
*F16H 1/28* (2006.01)
(52) U.S. Cl.
CPC ..................................... *F16H 1/28* (2013.01)
USPC ....................................................... 475/339
(58) Field of Classification Search
USPC .................. 475/331, 338, 339, 346
See application file for complete search history.

(56) References Cited

FOREIGN PATENT DOCUMENTS

| JP | 61-290262 A | 12/1986 |
|---|---|---|
| JP | 62-92341 U | 6/1987 |
| JP | 2004-19900 A | 1/2004 |
| JP | 2009-138928 A | 6/2009 |
| JP | 2010-060095 A | 3/2010 |
| JP | 2011-43224 A | 3/2011 |

OTHER PUBLICATIONS

International Search Report for PCT/JP2012/054527, Mailing Date of Apr. 24, 2012.

*Primary Examiner* — Jacob S Scott
(74) *Attorney, Agent, or Firm* — Westerman, Hattori, Daniels & Adrian, LLP

(57) ABSTRACT

A compact planetary gear reduction mechanism having a universal gear reduction ratio is provided, which comprises: an input shaft rotatable about a first rotational axis; at least one planetary gear having a first and a second gear of the same shape integrated together rotatably about a third rotational axis (O3) but in out of phase with each other; an eccentric rotary plate for transmitting the rotational motion of the input shaft to a shaft mechanism which in turn transmits the eccentric rotation of the eccentric rotary plate to the planetary gear; an external fixed sun gear meshed with the first gear of the planetary gear; and an external driven sun gear to be connected to the output shaft of the gear reducer, having a different number of gear teeth than the fixed sun gear and meshed with the second gear of the planetary gear.

2 Claims, 5 Drawing Sheets

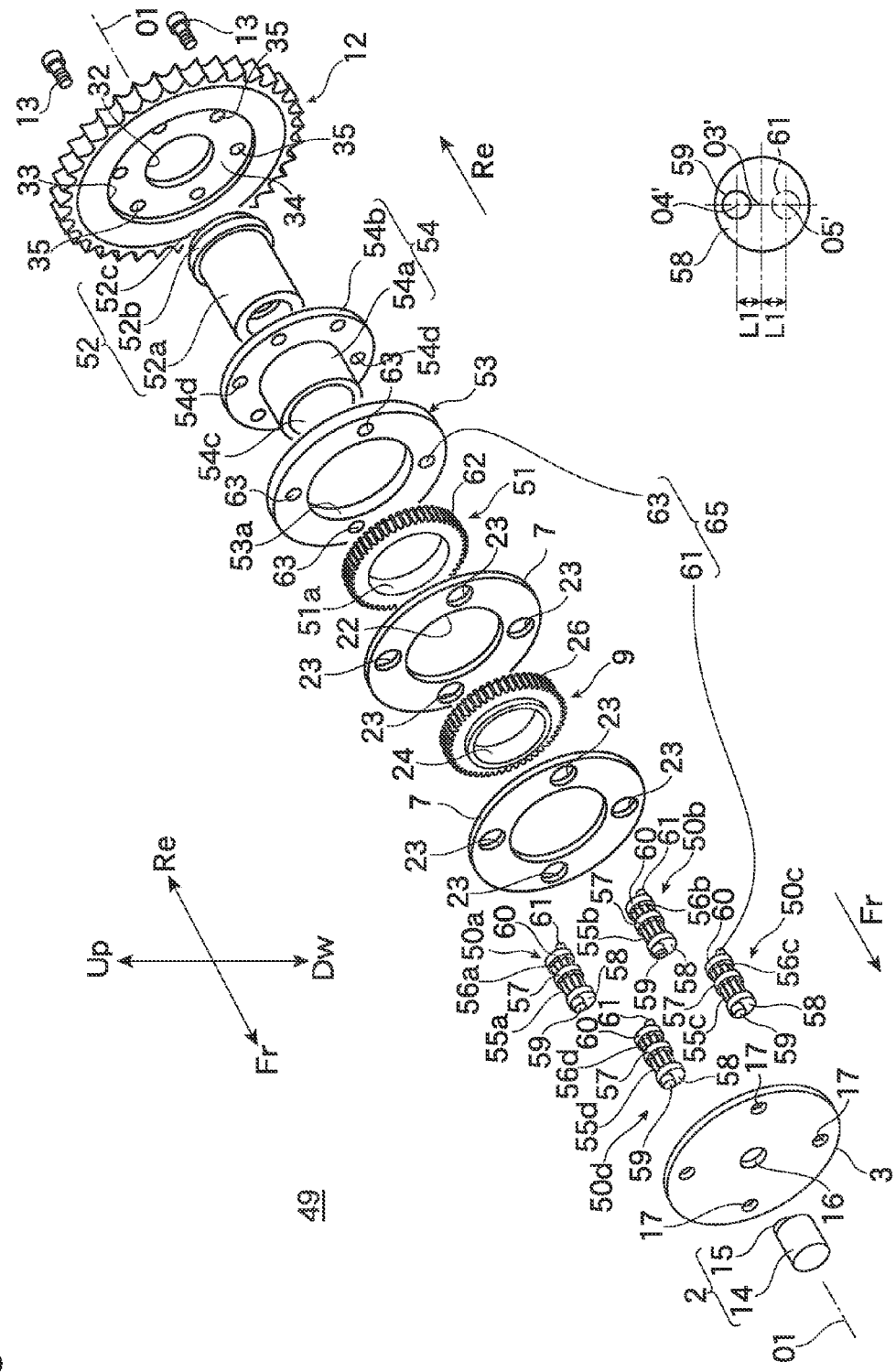

PLANETARY GEAR REDUCTION MECHANISM

TECHNICAL FIELD OF THE INVENTION

This invention relates to a compact planetary gear reduction mechanism capable of having an arbitrary gear ratio, thus having a preferred larger reduction ratio than conventional ones, and more particularly, to a paradoxical planetary gear reduction mechanism having such feature.

Patent Document 1 listed below discloses a planetary gear reduction mechanism obtained by improving a 3K-type paradoxical planetary gear reduction mechanism. Although a conventional 3K-type paradoxical planetary gear reduction mechanism has an advantage that it can provide a large gear ratio by reducing the difference in number of gear teeth (referred to as gear teeth difference) between a fixed ring gear and a driven ring gear as taught by Patent Document 1, its planetary gears cannot precisely mesh with these two ring gears having different gear teeth numbers unless the difference in the gear teeth numbers is an integral multiple of the number of planetary gears.

In a conventional 3K-type paradoxical planetary gear reduction mechanism, the more planetary gears are used, the more evenly distributed are the forces acting on the sun gear, planetary gears and ring, thereby enhancing their durability. On the other hand, the gear ratio is disadvantageously lowered due to the increase in gear teeth number Specifically, a maximum gear ratio is obtained in a conventional 3K-type paradoxical planetary gear reduction mechanism by setting the gear teeth difference to 1. In this case, however, only one planetary gear can be used and durability of the gears is lowered.

In order to overcome such problems as mentioned above, the planetary gears of the Patent Document 1 is designed to have a gear teeth difference of 1 between a fixed ring gear and a driven gear to ensure the highest rear reduction rate possible while utilizing a multiple planetary gears to enhance the durability of the gears. More particularly, the invention allows use of planetary gears that can properly mesh with both of the fixed ring gear and the driven ring gear having different gear teeth numbers even when the gear teeth difference between the fixed and driven ring gear is less than the number of planetary gears, that is, even when the gear teeth difference is 1, in a conventional planetary gear reduction mechanism as disclosed in the Patent Document 1. This can be done by the use of planetary gears each equipped with a pair of identical gears coaxially integrated together with a predetermined phase difference.

PRIOR ART DOCUMENT

Patent Document

Patent Document 1: JPA Laid Open 2004-19900

SUMMARY OF THE INVENTION

Objects of the Invention to be Achieved

While a down-sized planetary gear reduction mechanism having a large gear ratio is anticipated, the planetary gear reduction mechanism of the Patent Document 1 has a following unresolved problem.

First, the gear ratio of this planetary gear reduction mechanism is determined by the gear teeth numbers of the fixed ring gear, driven ring gear, and sun gear. Once the modules (or dimensions) and the gear teeth numbers of the ring gears are determined, the modules and gear teeth numbers of the planetary gears and the sun gear that mesh internally with the teeth of the ring gears are limited so that they can properly engage with the respective ring gears. In the planetary gears of the Patent Document 1, the higher is the gear ratio of the ring gear on the output shaft to the sun gear on the input shaft, the higher is the reduction gear ratio. However, if the gear teeth number of the sun gear is reduced relative to the ring gear having the same module as the sun gear, the installation space for the planetary gears becomes larger. Thus, in order to have the planetary gears to mesh with both of the ring gear and the sun gear, the planetary gears must have a large outer diameter, On the other hand, in order to prevent interference between neighboring planetary gears, it is necessary for the planetary gear reduction mechanism of the Patent Document 1 to limit, the number of planetary gears used.

Further, down-sizing of the internal ring gears of the planetary gear reduction mechanism of the Patent Document 1 may require special shaping of the teeth of the ring gears. Machining of such special gears, however, is difficult and increases manufacturing costs, thereby gives rise a difficult problem for down-sizing of the ring gears.

It is, therefore, an object of the present invention to provide a compact planetary gear reduction mechanism which has an arbitrary reduction gear ratio, particularly a large reduction gear ratio.

Means for Achieving the Object

A planetary gear reduction mechanism in accordance with claim 1 comprises: an input shaft rotatable about a first rotational axis; an output shaft; at least one planetary gear driven by the input shaft, the planetary gear having a first and a second gear of the same shape and of different rotational phase angle and integrated together rotatably about a third rotational axis (defined below); a fixed sun gear meshed with the first gear of the planetary gear; and a driven sun gear meshed with the second gear of the planetary gear and coaxially integrated with the output shaft, the driven sun gear having a different number of gear teeth than the fixed sun gear, the planetary gear reduction mechanism characterized in that:

the fixed sun gear and the driven sun gear are external gears;

the input, shaft is provided with an eccentric, rotary plate rotatable about a second rotational axis offset from the first rotational axis by a predetermined distance; and the planetary gear is provided with a shaft mechanism which is offset in the same eccentricity direction as the eccentric rotary plate from the third rotational axis by the predetermined distance and operably coupled to the eccentric rotary plate such that the shaft mechanism eccentrically rotates about the third rotational axis in synchronism with the eccentric rotoary plate.

(Function) The external fixed sun gear and the external driven gear of the planetary gear reduction mechanism of claim 1 correspond to the fixed ring gear and the driven ring gear, respectively, of the Patent Document 1, so that they are meshed with external planetary gear. It is noted that, unlike Patent Document 1 which utilizes a sun gear to convey the rotational motion of the input shaft to the planetary gears, the present invention utilizes a circular eccentric rotary plate that rotates about a second rotational axis of the input shaft and a shaft mechanism operable coupled to the eccentric rotary plate. Because, in the planetary gear reduction mechanism of claim 1, the planetary gear meshes only with the sun gear in this planetary gear reduction mechanism, the reduction gear ratio can be made larger by decreasing the gear teeth of the planetary gear to reduce the outer diameter of the gear. The planetary gear reduction mechanism of claim 1 can be strengthened down-sized by use of many down-sized planetary gears. Further, unlike a planetary gear reduction mechanism which incorporates a planetary gear and a sun gear inside a ring gear, the planetary gear reduction mechanism of claim 1 has a greater freedom of choice of modules and gear teeth numbers of the sun gear, driven sun gear, and planetary gears. Still further, configuration and arrangement of the gears of the invention are simpler as compared with conventional ones, thereby facilitating cost down of the planetary gear reduction mechanism.

In the planetary gear reduction mechanism of claim 1, the shaft mechanism rotates in the same manner as the circular eccentric rotary plate, and planetary gear is rotated by the shaft mechanism in synchronism therewith. The rotational speed of the planetary gear is greatly reduced in accordance with the gear ratio of the first gear to the fixed sun gear when the torque is transmitted from the input shaft to the planetary gear.

Since the planetary gear reduction mechanism of claim 1 does not include any internal gear, the planetary gear can be of any preferred module and can be down-sized without using any special teeth configuration. In other words, there will be no meshability problem if the gear is a down-sized involute gear, so that versatile gear reducers having different gear ratios can be easily manufactured at low costs.

The planetary gear reduction mechanism of claim 1 may further comprise, as defined in claim 2: a second shaft mechanism having a rotational axis symmetrical to the rotational axis of the first shaft mechanism with respect to the third rotational axis; and a second eccentric rotary plate supported by the second shaft mechanism rotatably about the rotational axis of the second shaft mechanism.

(Function) In the planetary gear reduction mechanism of claim 2, during the eccentric, rotation of the circular eccentric rotary plate (operably coupled to the input shaft), the second eccentric rotary plate symmetrical to the first eccentric rotary plate is eccentrically rotated about the first rotational axis. Consequently, the centrifugal forces acting on the first and second eccentric rotary plates cancel out, so that the eccentric rotary plates can be easily rotated.

Result of the Invention

According to the invention defined in claim 1, a compact planetary gear reduction mechanism has a versatile reduction gear ratio. Further, the gear reduction ratio can be larger than conventional ones.

The planetary gear reduction mechanism of claim 2 permits smooth. rotational motion of the planetary gear and the third driven sun gear.

BRIEF DESCRIPTION OF THE DRAWINGS

FIG. 5 is an exploded perspective view of the second embodiment.

BEST MODE FOR CARRYING OUT THE INVENTION

Figure 1:
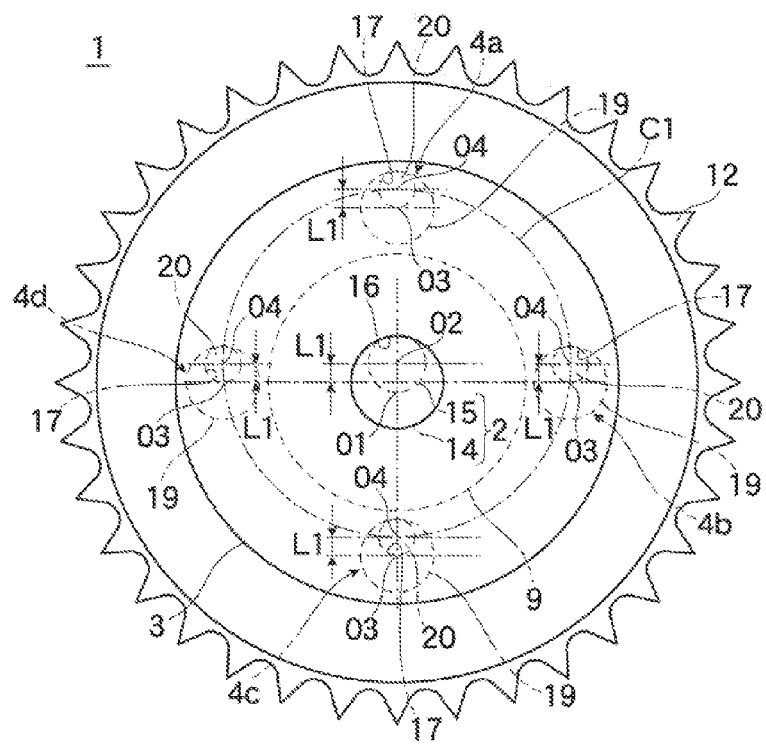
FIG. 1 is a front view of a planetary gear reduction mechanism in accordance with the first embodiment.
Figure 1:
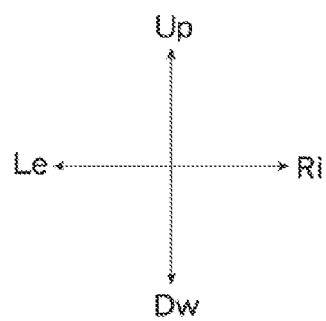

Referring to FIGS. 1 through 4, the invention will now be described in detail by way of example with reference to the first embodiment. In what follows the front, rear, upper, lower, left, and right sides of the planetary gear reduction mechanism will be denoted by symbols Fr, Re, Up, Dw, Le, and Ri, respectively.

A planetary gear reduction mechanism 1 has an input, shaft 2, an eccentric rotary plate 3, a set 4 of four planetary gears 4a-4d each consisting of a first gear (5a-5d) integrated with a second gear (6a-6d), a pair of supporting plates 7 for supporting the set 4 of planetary gears, a fixed sun gear 9, a driven sun gear 10, a center shaft 11, a sprocket 12 connected to the output shaft, and fixing bolts 13.

The eccentric shaft 15 shown in FIG. 1 is integral with the back side of the primary section 14, with the second rotational axis O2 of the eccentric shaft 15 offset upward from the first rotational axis O1 of the primary section 14 by a distance L1.

An eccentric rotary plate 3 is a disk having a central circular hole 16 and a multiplicity of circular holes 17. The eccentric rotary plate 3 is rotatably supported by the cylindrical eccentric shaft 15 fitted in the circular hole 16 so as to be rotatable about the rotational axis O2. As a consequence, when the input shaft 2 rotates about the first rotational axis O1, the eccentric rotary plate 3 is eccentrically rotated about the first rotational axis O1 of the input shaft 2. The circular holes 17 are formed such that their centers O3 are located on an circular orbit C1 centered at the second rotational axis O2. It, is noted that the eccentric rotary plate 3 is not limited to a circular disk so long as it is a plate.

Each of the four planetary gears 4a-4d of the first embodiment consists of one first four gear (5a-5d), one second gear (6a-6d), a circular partition plate 18, a circular base plate 19, and an eccentric shaft 20. The first and second gears 5a-5d and 6a-6d, respectively, are identical in shape, integrated onto the opposite sides of the circular partition plate 18. Each base plate 19 is integrated onto the front end of the first gear (5a-5d). Each first gear (5a-5d), second gear (6a-6d), circular partition plate 18, and base plate 19 are arranged coaxial with a third rotational axis O3 of that planetary gear. The second gears 6a-6d are integrated with the first gears 5a-5d with a predetermined phase difference relative thereto, as described later. The planetary gears 4a-4d engage with the sun gear 9 and driven sun gear 10 at multiple peripheral positions of the fixed sun gear 9 and driven sun gear 10. In this embodiment, the driven sun gear 10 has a less gear tooth number than the fixed sun gear 9 by 1.

Figure 4:
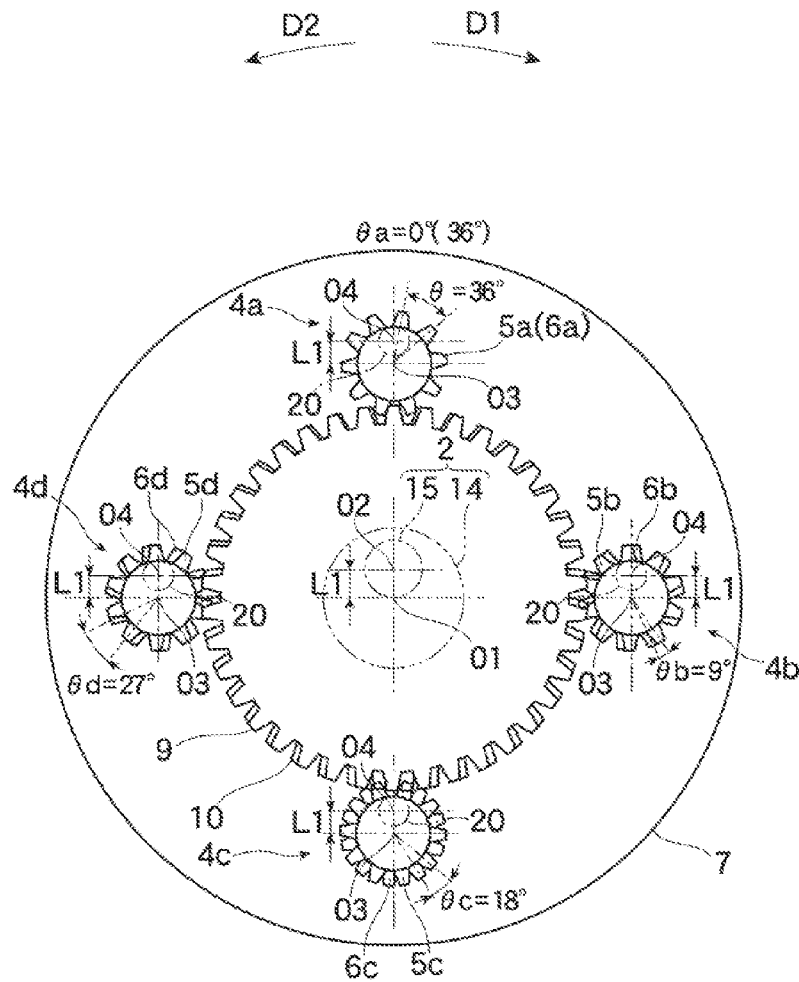
FIG. 4 is a diagram illustrating the arrangement of the eccentric rotary plate, planetary gears, and two sun gears.

It is noted here that the term "predetermined phase difference" implies the difference in phase angle between a first gear (5a-5d) and a corresponding second gear (6a-6d) of one planetary gear. This angular difference is determined by the angle θ between two neighboring teeth of a first (or second) gear about a third rotation axis O3 and the number of teeth n of that gear. In the first embodiment, the angular difference (between the first and second gears 5a-5d) is 0° for the first reference planetary gear, but increases by θ/n for each of n planetary gears arranged in the orbital direction. In the first embodiment, the number of teeth is 10, so that θ=36° as shown in FIG. 4, and the number of planetary gears n equals 4. Consequently, by denoting the respective angular differences between the first gear and its corresponding second gear by θa-θd, θa=0, θb=36°/4=9°, θc=18°, and θd=27°.

Thus, the phase difference between the first and second gears turns out to be 36° after one revolutionary angular shift of 360°. That is, the teeth of the two gears initially in phase will be out of phase by 36°, which amounts to bringing the teeth of the first gear in phase with the second gear. Consequently, in the first planetary gears, it is possible to have the first gears 5a-5d and second gears 6a-6d of the planetary gears 4a-4d engage with both of the fixed sun gear 9 and driven sun gear 10 if the gear teeth difference between the fixed sun gear 9 and driven sun gear 10 are not an integral multiple of the number of the planetary gears.

The eccentric shaft 20 is mounted on the front end of the base plate 19. The rotational axis of each eccentric shaft 20 (the axis referred to as fourth rotational axis O4) is offset upward from the third rotational axis O3 by a distance of L1. The eccentric shaft 20 is inserted in the corresponding circular hole 17 formed in the eccentric, rotary plate 3, which together forms a shaft mechanism 21. Each of the planetary gears 4a-4d is rotatably supported by the eccentric rotary plate 3 via the shaft mechanism 21 for eccentric, rotation. about the respective fourth rotational axis O4. Further, each of the planetary gears 4a-4d is rotatably supported by a pair of supporting plates 7 for rotation about the third rotational axis O3.

Each of the supporting plates 7 is a disk, formed with a circular hole 22 centered at the first rotational axis O1. Formed round each circular hole 22 of the supporting plates 7 are as many circular holes 23 as the planetary gears 4a-4d, with the centers of the circular holes 23 lying on an circular orbit of the same diameter as the circular orbit C1 and centered at the first. rotational axis O1.

The pair of the supporting plates 7 are arranged on the opposite sides of the fixed sun gear 9 fixed to the base member (not shown) for accommodating therein the planetary gears. The fixed sun gear 9 consists of has teeth 26, a front cylinder section 25 protruding from the front of the teeth 26 and the rear cylinder section (not shown) protruding from the rear end of the cylinder section. The rear cylinder section has the same shape as the front cylinder section 25. Formed at the center of the fixed sun gear 9 is a circular hole 24 which is also centered at the first, rotational axis O1. The supporting plate 7 arranged in front of the fixed sun gear 9 is rotatably and coaxially supported by the front cylinder section 25 in the circular hole 22. The supporting plate 7 arranged behind the fixed sun gear 9 is rotatably and coaxially supported by the rear cylinder section (not shown) with its rear cylindrical section (not shown) by inserted in the circular hole 22.

The planetary gears 4a-4d penetrate the respective circular holes 23 of the respective supporting plates 7 such that the first gears 5a-5d engage with the teeth 26 of the fixed sun gear 9 and the second gears 6a-6d engage with the teeth 27 (described later) of the driven sun gear 10.

The base plates 19 are rotatably fitted in the respective circular holes 23 of the front supporting plate 7, while the circular partition plates 18 are rotatably fitted in the respective rear circular holes 23.

Consequently, the planetary gears 4a-4d are supported by the pair of the supporting plates 7 for rotation about the third rotational axis third rotational axis O3.

The driven sun gear driven sun gear 10 arranged behind the rear supporting plate 7. The sprocket 12 is arranged behind the driven sun gear 10. In the first example, the driven sun gear 10 consists of a teeth section 27 having a less number of teeth than the fixed sun gear 9 and a flange section 28 coaxial with the first rotational axis O1 and integral with the rear end of the teeth section 27. The driven sun gear 10 is provided at the center thereof with a circular hole 29 of the same inner diameter as the circular hole 24 and centered at the axis O1, and a circular hole 30 communicating with a circular hole 29. The flange section 28 is provided with a multiplicity of (six in the example shown herein) threaded female through-hole 31 formed in the flange section 28.

Formed in the front end of the sprocket 12 is a circular stepped recess 33 having a circular hole 32 for rotatably receiving therein the flange section 28 of the driven sun gear 10. A multiplicity of (in the example shown herein, six through-holes 35 are formed in the bottom section 34 of the circular stepped recess 33 in association with the respective threaded holes 31 formed in the flange section 28.

The fixed sun gear 9, driven sun gear 10, and sprocket 12 are rotatably and coaxially supported by the center shaft 11 that rotates about the first rotational axis O1. The center shaft 11 includes a front cylinder section 36, a flange section 37, and a rear cylinder section 38, all integrated together rearward in the order mentioned. The fixed sun gear 9 is securely fixed to the front cylinder section 36 of the center shaft 11 by fitting the front cylinder section 36 into the circular hole 24. The driven sun gear 10 is supported by the front cylinder section 36 and flange section 37 rotatably about the first rotational axis O1 by rotatably fitting the front cylinder section 36 of the center shaft 11 in the circular hole 29 and fitting the flange section 37 in the circular hole 30.

The sprocket 12 is supported by the rear cylinder section 38 rotatably about the first rotational axis O1 by fitting the rear cylinder section 38 in the circular hole 32. The sprocket 12 is integrated with the driven sun gear 10 by inserting the fixing bolts 13 through corresponding through-holes 35 from behind and by screwing them into the threaded holes 31 of the flange section 28 (which is rotatably fitted in the stepped circular hole 33). The integrated driven sun gear 10 and sprocket 12 are rotatably supported by the center shaft 11.

Figure 2:
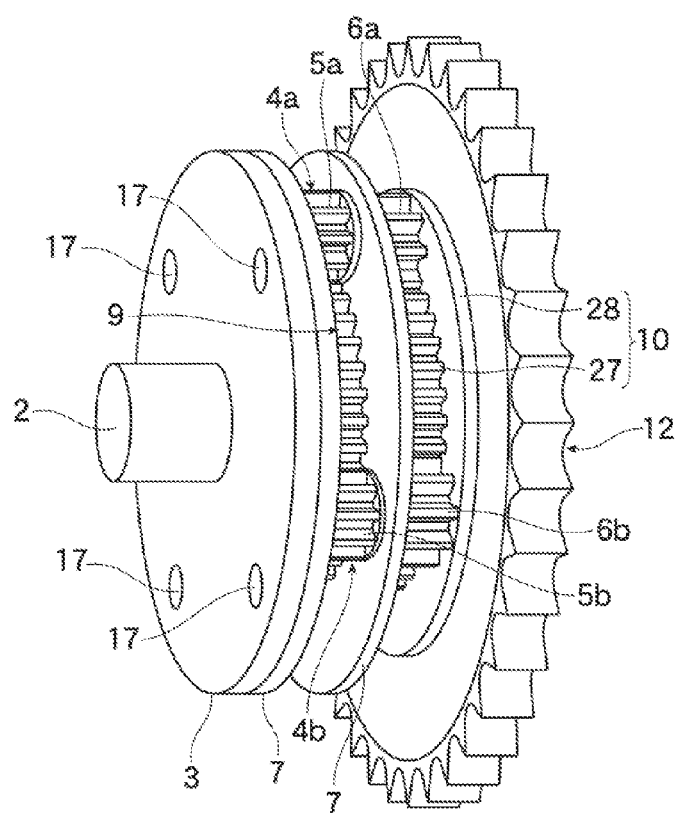
FIG. 2 is a perspective view of the planetary gear reduction mechanism of the first embodiment.
Figure 3:
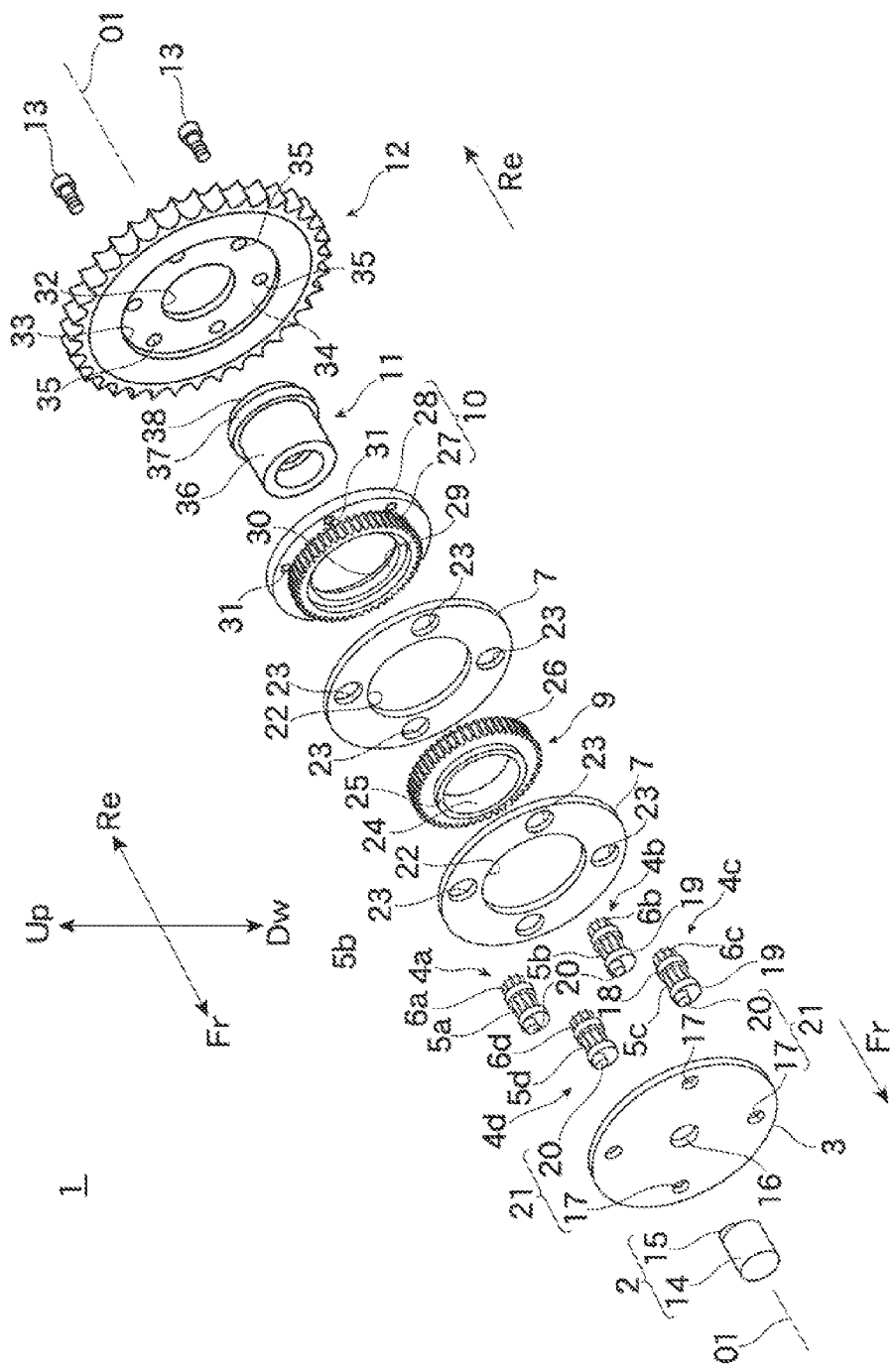
FIG. 3 is an exploded perspective view of the planetary gear reduction mechanism of the first embodiment.

It is noted that the planetary gears 4a-4d are disposed in position as they are sandwiched by the eccentric rotary plate 3 adjacent the front end of the base plate 19 and by the flange section 28 of the driven sun gear 10 adjacent the rear end of the second gears 6a-6d, as shown in FIG. 2. As a result, the circular partition plate 18 and the base plate 19 can rotate in the circular holes 23 of the paired supporting plates 7 (without coming out of the circular holes 23).

Next, the input shaft and the output shaft of the planetary gear reduction mechanism in operation according to the first embodiment will now be described. A torque inputted in the input shaft 2 is transmitted to the eccentric rotary plate 3, planetary gears 4a-4d, fixed sun gear 9, driven sun gear 10, and sprocket 12 in the order mentioned to rotate the output shaft connected to the sprocket 12.

First, as the input shaft 2 rotates, the cylindrical eccentric shaft 15, eccentrically offset upward from the first rotational axis O1 of the primary section 14 by a distance L1, is eccentrically rotated about the first rotational axis O1. The planetary gears 4a-4d are rotatably held in the circular holes 23 of the paired supporting plates 7, wherein the eccentric shafts 20 of the planetary gears 4a-4d are rotatably fitted in the respective circular holes 17 of the eccentric rotary plate 3, which are offset upward from the respective third rotational axes O3 by a distance of L1 in the same manner as the cylindrical eccentric shaft 15 of the input shaft 2. Consequently, as the eccentric rotary plate 3 eccentrically rotates about the first rotational axis O1 together with the cylindrical eccentric shaft 15, the eccentric shaft 20 eccentrically rotates about the third rotational axis O3 in synchronism with the eccentric rotary plate 3, thereby causing the planetary gears 4a-4d to be rotated about the third rotational axis O3. While spinning themselves, the planetary gears 4a-4d revolve about the fixed sun gear 9 fixed to a base (not shown) via the first gears 5a-5d that engages with the fixed sun gear 9. Consequently, through the rotations of the second gears 6a-6d that rotate together with the first gears 5a-5d, the driven sun gear 10 rotates together with the sprocket 12.

In the planetary gear reduction mechanism of the first embodiment, the rotational motion fed to the input shaft is greatly reduced as it is transmitted to the planetary gears 4a-4d via the eccentric rotary plate 3 and the shaft mechanism 21. Denoting the number of teeth (hereinafter referred to as teeth number) of the fixed sun gear 9 by ZSG1, the teeth numbers of the gears 5a-5d of the planetary gears 4a-4d by ZPG1, the gear reduction ratio U1 is given by the following formula $$U1=(ZSG1/ZPG1)+1$$

When ZPG1=10 and ZSG1=52 for example as shown in FIG. 4, the gear reduction ratio U1 turns out to be $$U1=52/10+1=6.2$$

On the other hand, the planetary gear reduction mechanism 1 of the first embodiment is obtained by replacing the fixed ring gear and driven ring gear of a conventional 3K-type paradoxical planetary gear reduction mechanism by the fixed sun gear 9 and driven sun gear 10, respectively, and by replacing the sun gear (providing the planetary gear with a torque) by the eccentric rotary plate 3 and the shaft mechanism 21. Thus, in the planetary gear reduction mechanism 1 of the first embodiment, rotational motion is also reduced in the transmission from the second gears 6a-6d to the driven sun gear 10. The gear reduction ratio U2 in this transmission can be expressed as follows.

In the present embodiment, while the planetary gears 4a-4d revolve about the fixed sun gear 9 once, the driven sun gear 10 rotates relative to the fixed sun gear 9 through an angle subtended by the number of teeth that differ between the driven sun gear 10 and the fixed sun gear 9. In the example shown herein, the gear teeth number of the driven sun gear 10 is less than that of the fixed sun gear 9 by 1, as described above. When the first gears 5a-5d of the planetary gears 4a-4d shown in FIGS. 3 and 4 revolve once in the counterclockwise direction D2 about the fixed sun gear 9 having fifty-two teeth for example, the second gears 6a-6d revolve about the driven sun gear 10 once plus a fractional revolution that amounts to one tooth of the driven sun gear, since the first gears 5a-5d and second gears 6a-6d have the same teeth number and the driven sun gear 10 has fifty-one teeth. Consequently, after one revolution, the driven sun gear 10 will rotate relative to the fixed sun gear 9 in the clockwise direction D1 through one inter-teeth angle (the angle hereinafter referred to as one-tooth angle) of the fixed sun gear 9 (that is, 360°/52≈6.92°).

As described above, since the driven sun gear 10 rotates by one tooth relative to the fixed sun gear 9 having fifty-two teeth while the planetary gears 4a-4d revolve about the fixed sun gear 9 once, the gear reduction ratio U2 is then given by $$U2=ZSG1/|\Delta ZSG|$$

where $\Delta Z$ is the gear teeth difference defined as the difference between the gear teeth number of the fixed sun gear 9 and that of the driven sun gear 10. In this example, U2=52/1=52, so that the relative rotation of the driven sun gear 10 occurs in the clockwise direction with respect to the fixed sun gear 9, which is opposite to the (counterclockwise) rotational direction of the input shaft 2.

Thus, it can be seen that the overall gear reduction ratio U between the input, shaft and the output shaft is given by $$U=U1*U2=6.2*52=392.4$$

It is noted that the rotational angle of the driven sun gear 10 relative to the fixed sun gear 9 is given by the relative rotational angle for one tooth times the gear teeth difference the two gears. For example, if the driven sun gear 10 has a gear teeth number less than the fixed sun gear 9 by two, the relative rotational angle of the driven sun gear 10 equals twice that of the relative rotational angle for one tooth, so that the resultant relative rotational angle is equal to 360°/52*2 which is about 13.8°.

On the other hand, if the driven sun gear 10 has more teeth than the fixed sun gear 9 by $\Delta ZSG$, the second gears 6a-6d revolve about the driven sun gear 10 through an angle equal to:

$$360°-(\text{rotational angle for one tooth of the fixed sum gear})*\Delta ZSG.$$

Consequently, the driven sun gear 10 rotates relative to the fixed sun gear 9 in the counterclockwise direction D2 through the same angle as the above rotational angle of the planetary gears 6a-6d.

Thus, when the driven sun gear 10 has more teeth than the fixed sun gear 9, so that $\Delta ZSG$ is negative, the gear reduction ratio U2 is the same as that obtained for a positive $\Delta ZSG$ but the direction of the rotation of the driven sun gear 10 is counterclockwise direction D2 relative to the fixed sun gear 9, which is the same as the rotational direction (counterclockwise direction D2) of the input shaft 2.

In the first embodiment, the rotation inputted to the input, shaft is first reduced by the factor of U1 as the rotation is transmitted to the planetary gears 4a-4d via the eccentric rotary plate 3 and the shaft mechanism 21, and then reduced by the factor of U2 as the rotation is transmitted from the planetary gears 4a-4d to the driven sun gear 10 via the fixed sun gear 9, so that the total gear reduction ratio between the input shaft to the sprocket 12 of the output shaft is greatly reduced by the factor of U1*U2.

It should be appreciated that the planetary gears 4a-4d are rotated by the eccentric rotary plate 3 and the eccentric shaft 20 in the first embodiment so that a ring gear system disclosed in the Patent Document 1 can be replaced by a pair of sun gears. Thus, in the first embodiment where such ring gear system is eliminated, the planetary gear reduction mechanism 1 is compact.

The elimination of a ring gear system increases freedom of gear design, allowing for different gear reduction ratios for the planetary gear reduction mechanism 1. For example, in the first embodiment, the elimination permits down sizing of the planetary gears 4a-4d, and use of planetary gears having a fewer teeth number, Which in turn permits a larger gear reduction ratio. Down sizing of planetary gears enables installation of a larger number of planetary gears and enhanced robustness of the entire planetary gear reduction mechanism.

It is noted that, unlike internal ring gears, none of external gears including the fixed sun gear 9 and the driven sun gear 10 never come into contact with neighboring gears. Thus, in the planetary gear reduction mechanism 1 of the first embodiment, the fixed and driven sun gears 9 and 10, respectively, need not have a special teeth configuration. Rather, they can be manufactured in the form of commonly used cost effective involute gears of different gear ratios.

Next, referring to FIG. 5, there is shown a planetary gear reduction mechanism 49 in accordance with a second embodiment of the invention. The planetary gear reduction mechanism 49 is structurally the same as the planetary gear reduction mechanism 1 of the first embodiment, except that planetary gears 50a-50d, a driven sun gear 51, and a center shaft 52 of the planetary gear reduction mechanism 49 are different in shape from the counter parts of the planetary gear reduction mechanism 1, and that a second circular eccentric plate 53 and a flanged cylinder 54 are additionally arranged behind the driven sun gear 51.

The planetary gears 50a-50d comprise first gears 55a-55d, second gears 56a-56d, partition plates 57, circular base plates 58, and eccentric shafts 59, all having the same shapes and configurations as the counterpart planetary gears 5a-5d, second gears 6a-6d, circular partition plate 18, circular base plate 19, and eccentric shaft 20 of the first embodiment. On the other hand, there are provided a second circular base plate 60 on the rear end of each second gear (56a-56d), and an eccentric shaft 61 protruding from the rear end of each second circular base plate 60. The second circular base plate 60 has the same shape as the circular base plate 58 and so does the eccentric shaft 61 as the eccentric shaft 61. The eccentric shaft 61 is offset from the eccentric shaft 59 to a position symmetrical to the eccentric shaft 59 with respect to the third rotational axis O 3' of the planetary gear (50a-50d) so that, like the eccentric shaft 59, the eccentric shaft 61 is also offset from the rotational axis O3' by the distance L1 (as shown in a small diagram in FIG. 5.)

The driven sun gear 51 has the same shape as the driven sun gear 10, with the flange section 28 of the driven sun gear 10 removed therefrom, and has a circular hole 51a centered at the first rotational axis O1.

The center shaft 52 consists of a front cylinder section 52a which has a longer axial length than the front cylinder section 36 of the center shaft 11 of the first embodiment, a flange section 52b having the same shape as the flange section 37, and a rear cylinder section 52c having the same shape as the rear cylinder section 38.

Formed at the center of the cylindrical body 54a is a circular hole 54c which is open at the rear end of the flange section 54b and has the same inner diameter as the outer diameter of the front cylinder section 52a. A multiplicity of (six in the second embodiment) threaded female through-holes 54d are formed in the flange section 54b, in association with the respective through-holes 35 of the sprocket 12.

The second circular eccentric plate 53 is a disk shaped member formed with a large central hole 53a. Formed round the central hole 53a, and at the positions associated with the eccentric shaft 61 of the planetary gears 50a-50c, are circular holes 63 each having the same inner diameter as the outer diameter of the eccentric shaft 61. The centers of the circular holes 63 lie on a circular orbit centered at the central axis (not shown) offset downward from, and in parallel to, the first rotational axis O1 by the distance M. The inner diameter of the central hole 53a is larger than the outer diameter of the cylindrical body 54a of the flanged cylinder 54. It is noted that the second circular eccentric plate 53 is configured to have the same weight as the eccentric rotary plate 3 by adjusting its outer diameter and thickness. The shape of the second circular eccentric plate 53 is not limited to a circle, provided that the center of gravity of the second circular eccentric plate 53 is symmetrical to that of the eccentric rotary plate 3 with respect to the first rotational axis O1.

The flanged cylinder 54 is securely fixed to the driven sun gear 51 by passing the leading end of the cylindrical body 54a through the central hole 53a of the second circular eccentric plate 53, and by firmly fitting the leading end in the circular hole 51a. The center shaft 52 has a front cylinder section 52a rotatably fitted in the circular hole 54c of the flanged cylinder 54, and a rear cylinder section 52c rotatably fitted in the circular hole 32 of the sprocket 12. The sprocket 12 is securely fixed to the flanged cylinder 54 by passing through the holes 35, and screwing, a multiplicity of screws 13 in the corresponding female threads 54d. Consequently, the flanged cylinder 54 and the sprocket 12 are mounted on the center shaft 52 so as to be rotatable about the first rotational axis O1.

On the other hand, the fixed sun gear 9 is securely fixed to the center shaft 52 by fitting into the circular hole 24 of the sun gear 9 the front cylinder section 52a of the center shaft 52 which projects forward through the circular hole 22 of the rear support plate 7.

The planetary gears 50a-50d pass through the respective circular holes 23 of the two support plates 7. The first, gears 55a-55d are arranged at angularly regular intervals along the periphery of the fixed sun gear 9 so as to be meshed with the teeth 26 of the fixed sun gear 9, while the second gears 56a-56d are arranged at angularly regular intervals along the periphery of the driven sun gear 51 so as to be meshed with the teeth 62 of the sun gear 51. Each of the partition plates 57 and the circular base plates 58 are rotatably fitted in the respective circular holes 23 of the two support plates 7.

The eccentric shafts 61 are rotatably fitted in the respective circular holes 63 of the second circular eccentric plate 53 to support the second circular eccentric plate 53. The eccentric shafts 61 and the circular holes 63 together constitute a second shaft mechanism 65.

When the eccentric rotary plate 3 is eccentrically rotated by the input shaft 2 about the first rotational axis O1, the second circular eccentric plate 53 is also eccentrically rotated about the first rotational axis O1 symmetrically to the eccentric rotary plate 3. Since the eccentric rotary plate 3 and the second circular eccentric plate 53 are of the same weight and have their centers of gravity distributed symmetrical to each other across the first rotational axis O1, the centrifugal forces acting on the eccentric rotary plate 3 and the second circular eccentric plate 53 cancel out, making easy the rotation of the two circular eccentric rotors 3 and 53.

It should be understood that the number of the planetary gears can be any positive integer including 1, and of course it is not limited to 4 as exemplified in the embodiment.

1 planetary gear reduction mechanism
2 input shaft
3 eccentric rotary plate
4a-4d planetary gears
5a-5d first gears
6a-6d second gears
9 fixed sun gear
10 driven sun gear
14 primary section of input, shaft
15 eccentric shaft
17 circular holes of circular eccentric rotary plate
20 eccentric shafts of planetary gears
21 shaft mechanism
49 planetary gear reduction mechanism
50a-50d planetary gears
61 eccentric shafts of planetary gears
63 circular holes of second eccentric rotary plate
65 second shaft mechanism
O1 first rotational axis
O2 second rotational axis
O3, O3', O3" third rotational axes
O4, O4', O4" fourth rotational axes
O5 rotational axis of second shaft mechanism
L1 offset distance of second rotational axis

The invention claimed is:

1. A planetary gear reduction mechanism comprising an input shaft rotatable about a first rotational axis, an output shaft, at least one planetary gear driven by the input shaft, the planetary gear having a first and a second gear of the same shape but having different rotational phase angles and integrated together rotatably about a third rotational axis, a fixed sun gear meshed with the first gear of the planetary gear, and a driven sun gear meshed with the second gear of the planetary gear and coaxially integrated with the output shaft, the driven sun gear having a different gear teeth number than the fixed sun gear, the planetary gear comprising:

the fixed sun gear and the driven sun gear are external gears;

the input shaft is provided with an eccentric rotary plate rotatable about a second rotational axis offset from the first rotational axis by a predetermined distance; and the planetary gear is provided with a shaft mechanism which is offset in the same eccentricity direction as the eccentric rotary plate from the third rotational axis by the predetermined distance and operably coupled to the eccentric rotary plate such that the shaft mechanism eccentrically rotates about the third rotational axis in synchronism with the eccentric rotary plate.

2. The planetary gear reduction mechanism according to claim 1, further comprising:

a second shaft mechanism having a rotational axis symmetrical to the rotational axis with respect to the third rotational axis; and a second eccentric rotary plate supported by the second shaft mechanism rotatably about the rotational axis f the second shaft mechanism.

\* \* \* \* \*